United States Patent [19]

Gay et al.

[11] Patent Number: 4,816,556
[45] Date of Patent: Mar. 28, 1989

[54] ORDERED POLYETHERKETONES

[75] Inventors: Frank P. Gay, Hockessin, Del.; Christine M. Brunette, West Hartford, Conn.

[73] Assignee: E. I. Du Pont de Nemours and Company, Wilmington, Del.

[21] Appl. No.: 762,252

[22] Filed: Aug. 2, 1985

Related U.S. Application Data

[63] Continuation-in-part of Ser. No. 704,531, Feb. 22, 1985, abandoned.

[51] Int. Cl.[4] .................. C08G 8/02; C08G 14/00
[52] U.S. Cl. .................... 528/176; 528/125; 528/126; 528/128; 528/206; 528/207
[58] Field of Search ............. 528/176, 125, 128, 126, 528/206, 207

[56] References Cited

U.S. PATENT DOCUMENTS

| | | | |
|---|---|---|---|
| 3,065,205 | 11/1962 | Bonner | 260/63 |
| 3,441,538 | 4/1969 | Marks | 260/49 |
| 3,442,857 | 5/1969 | Thornton | 260/47 |
| 3,516,966 | 6/1970 | Berr | 260/47 |
| 3,524,833 | 8/1970 | Darms | 260/47 |
| 3,637,592 | 1/1972 | Berr | 260/47 |
| 3,666,612 | 5/1972 | Angelo | 161/165 |
| 3,668,057 | 6/1972 | Agolini et al. | 161/165 |
| 3,674,627 | 7/1972 | Angelo | 161/175 |
| 3,767,620 | 10/1973 | Angelo et al. | 260/47 |
| 3,791,890 | 2/1974 | Gander et al. | 260/61 |
| 4,293,670 | 10/1981 | Robeson et al. | 525/436 |

FOREIGN PATENT DOCUMENTS 163464 12/1985 European Pat. Off. .
8401535 4/1985 PCT Int'l Appl. .

Primary Examiner—John Kight
Assistant Examiner—M. L. Moore

[57] ABSTRACT

Ordered copolymers of tere- and isophthalyl halides with diphenyl ether where the phthalyl groups alternate or where the terephthalyl or isophthalyl groups are in blocks are disclosed. These novel ordered copolyetherketones exhibit a higher level of crystallization and more rapid crystallinity behavior than corresponding random copolyetherketones. They also form completely miscible blends with certain aromatic polyetherimides.

16 Claims, 1 Drawing Sheet

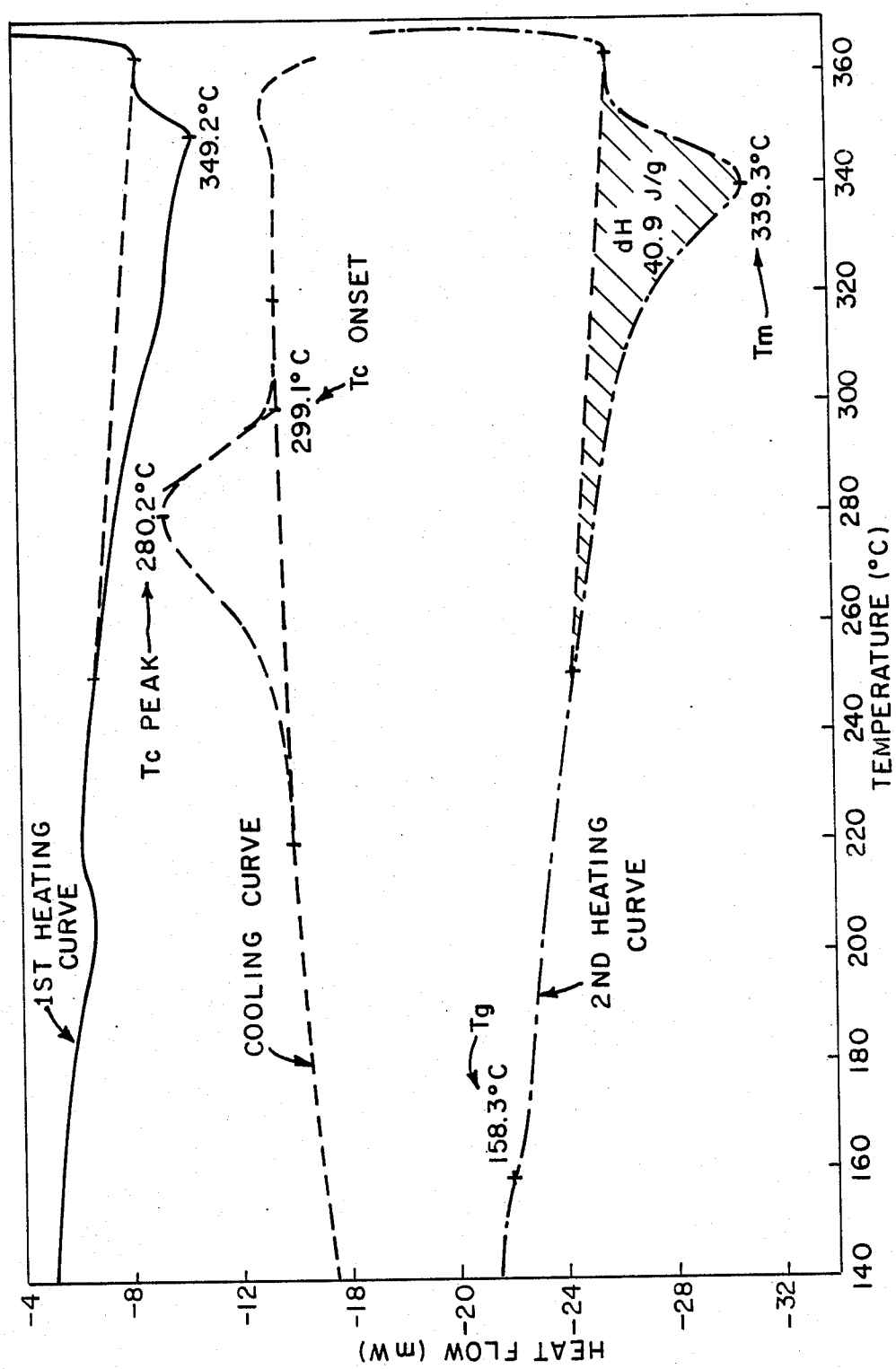

ORDERED POLYETHERKETONES

CROSS-REFERENCE TO RELATED APPLICATION

This is a continuation in part of out copending application Ser. No. 704,531 filed Feb. 22, 1985, and now abandoned.

BACKGROUND OF THE INVENTION

This invention relates to novel ordered copolyetherketones and, more precisely, to copolymers of tere- and isophthalyl halides with diphenyl ether where the phthalyl groups alternate or where the terephthalyl or isophthalyl groups are in blocks. The invention also relates to processes for preparing the novel copolyetherketones and to shaped articles and composite structures containing them. The invention also relates to blends of the novel copolyetherketones with other polymers and, especially, with certain polyetherimides.

Random copolymers of tere- and isophthalyl chloride with diphenyl ether are known in the art. U.S. Pat. Nos. 3,516,966 and 3,637,592, issued to Berr on June 23, 1970, and Jan. 25, 1972, respectively, disclose crystalline copolyketones having the following repeating structural unit

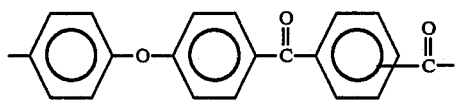

where the  moiety is either  or

Both patents disclose that the copolyketones may be prepared by combining diphenyl ether and a mixture of terephthalyl halide and isophthalyl halide with a Friedel-Crafts catalyst such as boron trifluoride. Such reactions are further described in U.S. Pat. No. 3,441,538, issued to Marks on Apr. 29, 1969. An improvement in the process, which allows formation of a granular product, is disclosed in U.S. Pat. No. 3,791,890, issued to Gander et al. on Feb. 12, 1974.

A number of varied uses for the known diphenyl ether/tere- and isophthalyl halide copolymers have also been disclosed. U.S. Pat. No. 3,666,612, issued to Angelo on May 30, 1972, discloses heat-sealable copolyketone film structures consisting of a crystalline layer and an amorphous layer, both layers being comprised of copolyxers of diphenyl ether and tere- and isophthalyl halides. U.S. Pat. No. 3,674,627, issued to Angelo on July 4, 1972, discloses the use of films of copolymers of diphenyl ether and tere- and isophthalyl halides as insulation wrapping for electrical conductors. And U.S. Pat. No. 3,668,057, issued to Agolini et al. on June 6, 1972, discloses laminar structures comprising a layer of metal bonded to a layer of crystalline diphenyl ether/tere- and isophthalyl halide copolymer.

Although the above-cited patents disclose copolymers of diphenyl ether and tere- and isophthalyl halides, they disclose only random copolymers, i.e., copolymers in which the tere- and isophthalyl units are randomly dispersed along the backbone of the polymer chain. These random copolyetherketones were of limited utility for a number of reasons. At higher ratios of terephthalyl (T) content to isophthalyl (I) content, the melting point of the copolyetherketone tended to be too high and instability set in. Conversely, at lower T/I ratios, where the melting point dropped off, so too did the retention of physical properties at elevated temperatures. Thus, upper use temperatures for such copolyetherketones were too low. Also, at lower T/I ratios, the degree of crystallinity of the copolyetherketones decreased, and they became more sensitive to solvents and stress cracking. Finally the propensity of the random copolyetherketones to crystallize was poor. This required long hold times during molding to allow the attainable level of crystallinity to develop.

SUMMARY OF THE INVENTION

Novel crystalline ordered copolymers of diphenyl ether and tere- and isophthalyl halides have now been found which avoid many of the disadvantages inherent in the prior art random copolyetherketones. The ordered copolyetherketones of this invention consist essentially of the two repeat units represented by the formulas

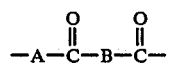 (a)

and

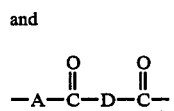 (b)

where A is 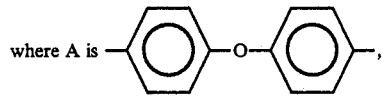

B is 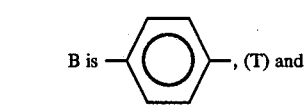, (T) and

D is , (I)

where the (a) and (b) units occur at a ratio in the range of 80:20 to 25:75. These novel copolyetherketones are characterized by one or more of the following properties:

(i) having a dH which is at least 5 J/g greater than the dH of a copolyetherketone of the same gross composition wherein the repeat units occur in random sequence, dH being the heat of fusion, (ii) having a dT which is at least 5° C. less than the dT of a copolyetherketone of the same gross composition wherein the repeat units occur in random sequence, dT being the difference between the melting point and the temperature of onset of crystallization, and (iii) having a Tm which is at least 5° C. greater than the Tm of a copolyetherketone of the same gross composition wherein the repeat units occur in random sequence, Tm being the melting point.

With these ordered copolyetherketones one can combine a desired melting point and a high level of crystallinity with rapid crystallization behavior. As a result, the copolyetherketones have good retention of properties at elevated temperatures, have good solvent stress crack resistance and can be rapidly molded. These copolyetherketones also have the advantage of forming completely miscible blends with certain polyetherimides.

BRIEF DESCRIPTION OF THE DRAWING

The FIGURE represents a sample thermal analysis (DSC) scan. The three curves shown represent, in oder, the first heating curve, the cooling curve and the second heating curve. It is from this type of scan that one can derive the dH (heat of fusion), dT (crystallization rate, or difference between the melting point and the onset of crystallization) and the Tm (melting point) for copolyetherketone samples.

DETAILED DESCRIPTION OF THE INVENTION

The crystalline copolyetherketones of this invention are distinguishable over the prior art copolyetherketones in that they are ordered rather than random. By the term ordered it is meant that the terephthalyl groups either alternate with the isophthalyl groups along the copolymer chain (alternating copolymer) or the terephthalyl or isophthalyl groups are in blocks along the copolymer chain (block copolymer). The copolyetherketones of this invention may not be in perfect order, i.e., it is possible that not all of the terephthalyl and isophthalyl groups will be in blocks or in perfectly alternating order; however, the copolyetherketones will be ordered to the extent necessary to possess the thermal properties described above (dH, dT and Tm).

The alternating copolymer of this invention can be illustrated as follows:

∼∼-DPE-I-DPE-T-DPE-I-DPE-T-DPE-∼∼ where DPE is a diphenylether unit, I is an isophthalyl unit and T is a terephthalyl unit. A block copolymer of this invention can be illustrated as follows:

-(DPE-T-DPE-T-DPE-T-DPE)-∼∼
-(DPE-T-DPE-T-DPE-T-DPE)-∼∼

The particular block copolymer illustrated above may be referred to in shorthand as a 4/3T block copolyxer as it has three terephthalyl units sandwiched between four diphenyl ether units. When referring to the "size" of the terephthalyl blocks, one can refer to either an average Flory distribution, which can be inferred from the melting point of the polymer, or a specific block size, free of distribution, which is achieved by making oligomers of that specific size and repolymerizing with the acid halide(s) and additional diphenyl ether. Copolymers having blocks of 2 to 4 terephthalyl units are preferred because the melting points of said copolymers remain in a practical range and their preparation is readily controlled.

In the copolyetherketones of this invention, the ratio of terephthalyl units to isophthalyl units is in the range of 80:20 to 25:75. Copolymers with a T/I ratio in the range of 70:30 to 30:70 are preferred for the reason that melting points can be maintained low enough to give good processing stability and yet achieve good levels of crystallinity. The most preferred copolymer has a T/I ratio of about 50:50.

The ordered copolyetherketones of this invention may be made by first allowing terephthalyl chloride to react with diphenyl ether, adjusting the relative stoichiometry so that the average unit is that desired and is capped with diphenyl ether. (For example, for a 3/2 block ABABA, where A=diphenyl ether and B=terephthalyl, one uses molar ratios of 3A and 2B.) A Friedel-Crafts catalyst such as anhydrous aluminum chloride is added on the basis of one mole per mole of acid chloride group (i.e., 2 moles catalyst per mole iso- or terephthyl chloride) plus one mole per mole of diphenyl ether. An excess of catalyst, e.g. about 1 to 5%, is useful since it can compensate for varying purity of purchased aluminum chloride and/or adventitious water. The aluminum chloride is preferably added to the reaction mixture at 0° C. or below to suppress side reactions such as ortho attack on diphenyl ether or attack on the solvent, both of which can upset stoichiometry. Since terephthalyl chloride reacts somewhat sluggishly at −10° C., when all the aluminum chloride is added the reaction may be pushed to completion by heating to about 10° to 20° C. After cooling, any remaining diphenyl ether and acid chloride(s) needed to attain desired acid ratios are added, followed by addition of aluminum chloride calculated on the same basis as before. If terephthalyl chloride is added at this stage along with the isophthalyl chloride, the resulting polymer will have randomized sequences between the terephthalyl blocks. When completed, the system is heated rapidly to 100° C. with vigorous agitation. Addition of hot solvent is a convenient way of doing this. The procedure described above could be reversed, forming oligomers of isophthalyl chloride first.

In an alternative process, bis-(4-phenoxybenzoyl)-1,4-benzene is used as a starting material. Terephthalyl chloride and diphenyl ether may be added to the bis-(4-phenoxybenzoyl)-1,4-benzene under conditions described above to prepare "blocks" of the terephthalyl groups of the length desired, and then isophthalyl chloride and diphenyl ether are added to attain desired acid ratios. Addition of terephthalyl chloride along with the isophthalyl chloride and diphenyl ether in the second step will lead to a polymer with randomized segments between the terephthalyl blocks. Alternatively, isophthalyl chloride may be added directly to the bis-(4-phenoxybenzoyl)-1,4-benzene to attain the alternating copolymer structure. In either case, the amount of catalyst is four moles per each mole of bis-(4-phenoxybenzoyl)-1,4-benzene, one mole per each mole of diphenyl ether plus two moles per each mole of phthalyl chloride. This process can be reversed by starting with bis-(4-phenoxybenzoyl)-1,3-benzene and adding terephthalyl chloride. Halogenated hydrocarbons are among the suitable solvents for these reactions. Orthodichlorobenzene is the preferred solvent, although reactions have been run in dichloromethane and tetrachloroethylene.

The copolyetherketones of this invention are superior to the random copolyetherketones of the prior art for reasons mentioned above such as high levels of crystallinity, rapid crystallization behavior and good retention of properties at elevated temperatures. These advantageous properties derive from the fact that the copolyetherketones are ordered. This ordered nature is evidenced by certain thermal analysis data for these polymers. The thermal characteristics used herein to distinguish the ordered copolyetherketones of this invention from random copolyetherketones of the prior art are the heat of fusion, dH, the measure of crystallization rate, dT, and the melting point, Tm.

For the purposes of this invention, the dH, dT and Tm for a sample can be determined by thermal analysis using Differential Scanning Calorimetry (DSC). A typical DSC scan is shown in FIG. 1. The three curves shown represent, in order, the first heating curve, the cooling curve, and the second heating curve. The first heating process is used to give the samples a common heat history. The cooling curve yields information on the crystallization tendency of the polymer. On the cooling curve are marked the temperature at which the onset of crystallization occurs (Tc onset) and the peak temperature of the crystallization exotherm (Tc peak). The second heating curve shows the glass transition temperature (Tg), and the peak melting point (Tm). The shaded area between the actual curve as it extends downward to the peak melting point (Tm) and the baseline represents the heat of fusion (dH).

In some instances, the DSC curve for a copolymer sample may exhibit multiple melting peaks. For the purpose of this invention, in such situations Tm is considered to be the highest temperature at which one of the melting peaks is seen.

To obtain the DSC curve the sample is heated to a given temperature above the melting point at a particular temperature rate (deg/min). After being held at this temperature for some time (approximately two to fifteen minutes) the sample is cooled to below the glass transition temperature (Tg) at a given temperature rate, generating the cooling curve. The sample is then reheated to a given temperature above the melting point to yield the second heating curve. The heating and cooling rates are about 10 to 20 degrees per minute.

The dH or heat of fusion values (but not necessarily Tm or dT) are obtained using samples that have been annealed. The annealing step is carried out after the first heat by cooling the sample to the annealing temperature and holding it at this temperature for the desired amount of time before proceeding with further cooling. The optimum annealing temperature and annealing time are determined for each individual sample and represent those conditions that yield the highest dH. In general, the annealing temperatures are within 100 centigrade degrees of Tm and range between about 220°-265° C. with annealing times of about 15 to 30 minutes. The sample is then cooled to room temperature and the second heat run to obtain the dH. The baseline for the dH determination is drawn from a point on the heating curve approximately 5-10 degrees below the annealing temperature to a point on the heating curve just beyond the temperature at which melting is complete. When multiple melting peaks are present, dH is calculated by measuring the area between the baseline and all of the peaks.

The dT or crystallization rate values are determined by measuring the difference in degrees between the peak melting temperature (Tm) and the temperature at the onset of crystallization (Tc onset). Where dT values are compared they have been determined from DSC scans in which the maximum temperatures of the first heat are approximately the same number of degrees above the melting point. As the first heat maximum temperature is increased, the dT value will increase until a plateau is reached where the dT value does not change with further increases in maximum temperature. The dT values being compared have been taken from this plateau region.

The ordered copolyetherketones of this invention differ from the random copolyetherketones of the art by having one or more of the following properties:

(i) a dH which is at least 5 J/g greater than the dH of a copolyetherketone of the same gross composition wherein the repeat units occur in random sequence, (ii) a dT which is at least 5° C. less than the dT of a copolyetherketone of the same gross composition wherein the repeat units occur in random sequence, and (iii) a Tm which is at least 5° C. greater than the Tm of a copolyetherketone of the same gross composition wherein the repeat units occur in random sequence.

By the phrase "same gross composition" as used above, it is meant a copolyetherketone having the same DPE, T and I content as another copolyetherketone. It should be noted that in some cases the thermal properties (dH, dT and Tm) of a random copolyetherketone will not be measurable by the above-described technique because the random copolyetherketone will not be crystalline. In such case, the crystalline ordered copolyetherketone of the same gross composition as the noncrystalline random copolymer and which exhibits measurable dH, dT, Tm shall be considered to be within the scope of this invention even though the thermal properties of the two copolymers cannot be compared in the manner cited above.

Preferred ordered copolyetherketones of this invention possess one or more of the following properties:

(i) a dH which is at least 10 J/g greater than the dH of a random copolyetherketone of the same gross composition, (ii) a dT which is at least 10° C. less than the dT of a random copolyetherketone of the same gross composition; and (iii) a Tm which is at least 10° C. greater than the Tm of a random copolyetherketone of the same gross composition.

It may be possible to alter the structure of the copolyetherketones described and claimed herein by adding small amounts (e.g. up to about 30 mole %) of other monomers which do not alter the overall characteristics of the polymer. Examples of such monomers include but are not limited to monoacylchlorides bearing a readily acetylatable position such as 3- or 4-phenoxylbenzoylchloride, and materials such as bis(4-phenoxy)benzophenone or 1,10-(bis-4-phenoxyphenyl)-1,10-dioxodecane. These altered copolymers are deemed to be within the scope of this invention when they possess the thermal characteristics specified in this application.

The novel copolyetherketones of this invention can be used in the form of shaped articles which can be prepared from the melt phase by extrusion, injection molding, compression molding or other convenient means. Such shaped articles include films, flaments, mechanical parts and the like. The copolyetherketones can also be used in the form of coatings. Using common coating techniques, coatings can be applied to wire, films, fabrics, etc.

The ordered copolyetherketones of this invention can also be combined with fibrous substrates or particulate fillers using known methods to form composite structures. Fibrous substrates can include woven, nonwoven, tow, felt or undirectional continuous fibers. For many applications, such as various aerospace components, carbon fibers and aramid fibers, which produce light and strong composites, are the most preferred. Other fibers include, among others, glass, boron and asbestos fibers. Particulate fillers include carbon and graphite powders, mica, silica, clay and silicon carbide whiskers. The composite structures may optionally contain additves such as antioxidants, pigments, coupling agents for fillers, lubricants and anti-stick agents. Whether one deals with a fiber-reinforced or a particulate-filled copolyetherketone composition, the product may contain up to about 70 volume % of the additive.

The copolyetherketones of this invention may be blended with other high performance polymers to prepare polymer blends useful for a number of purposes. Examples of polymers with which the copolyetherketones may be blended include, but are not limited to, the following:

(a) Polysulfones, such as those disclosed in U.S. Pat. No. 3,795,660, G.B. Nos. 1,398,133, 1,109,842 and 1,016,245. Specific examples include that having the repeating unit

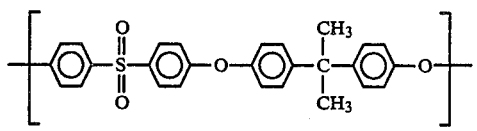

and sold under the tradename Udel by Union Carbide; or that having the repeating unit

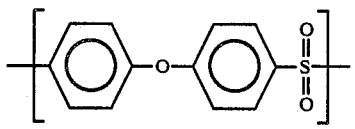

and sold under the tradename Victrex by Imperial Chemical Industries; or that having the repeating unit

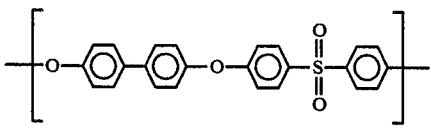

and sold under the tradename Radel by Union Carbide;

(b) Polysulfides, such as those disclosed in U.S. Pat. No. 3,870,687, a specific example being that having the repeating unit

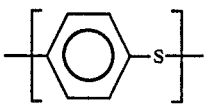

and sold under the tradename Ryton by Phillips Petroleum Company;

(c) Polyphenylene oxides, such as those disclosed in U.S. Pat. No. 3,639,508. An example is the reaction product of polystyrene and

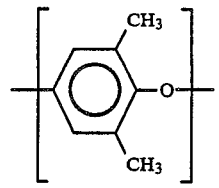

sold under the tradename Noryl by General Electric Company;

(d) Polyarylates, such as those prepared from an aromatic dicarboxylic acid and a bisphenol as disclosed in U.S. Pat. Nos. 3,216,970 and 4,126,602. Specific examples are those polyarylates prepared from Bisphenol A and isophthalic and/or terephthalic acid and sold under the tradenames Ardel by Union Carbide and Durel by Occidental Chemical;

(e) Polycarbonates, such as those disclosed in U.S. Pat. No. 3,144,432, a specific example being that having the repeating unit

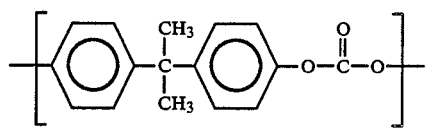

and sold under the tradename Lexan by General Electric Company;

(f) Polyetherimides, such as those disclosed in U.S. Pat. No. 3,833,546, a specific example being that having the repeating unit

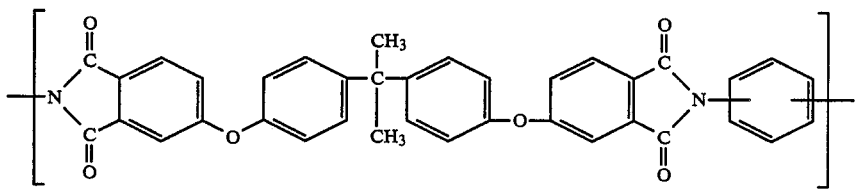

and sold under the tradename Ultem by General Electric Company; and those having the structures as taught in European Patent Application No. 84301679.1, published Oct. 17, 1984 (Publication No. 122060).

The blend may contain about 90 to 10% by weight of the ordered copolyetherketone and, thus, about 10 to 90% by weight of one or more other polymers. Methods of blending polymers are known in the art and include film blending in a press, blending in a mixer (e.g. Haake mixer) and extruder blending.

A special advantage of the copolyetherketones of this invention is their ability to form completely miscible blends with the polyetherimide sold under the tradename Ultem (General Electric Company), this polyetherimide being the reaction product of equimolar amounts of 2,2-bis[4-(3,4-dicarboxy-phenoxy)phenyl]-propane dianhydride and m-phenylenediamine. By completely miscible it is meant that a single Tg (glass transition temperature) is observed for all proportions of the blend, that single Tg falling between the Tg's of the copolyetherketone and the polyetherimide. (The Tg's, for the purpose of determining complete miscibility of blends according to this invention, are obtained from the second heat. In other words, the sample is heated to a temperature above the melting point, cooled to below the first Tg, and then reheated (second heat)). The miscibility of the copolyetherketone-polyetherimide blends is also evidenced by their visual clarity and the presence of homogeneity on a microscopic level.

Because the copolyetherketone-polyetherimide blends are miscible, any heat distortion temperature between that of the copolyetherketone and the polyetherimide can be obtained by blending the two. The blend can be tailored for specific end-use applications of composite and injection molded parts or films as specified by the polyetherketone-polyetherimide proportions. Blending of the polyetherketones of this invention with low cost but high performance polyetherimides also offers obvious economic advantages.

Generally, the copolyetherketone/polyetherimide blends are completely miscible within the ranges of 10 to 90 weight % of copolyetherketone and 90 to 10 weight % of polyetherimide. Preferably, however, the blends will contain 30 to 70 weight % of copolyetherketone and 70 to 30 weight % of polyetherimide. Additional polymers may also be added to the copolyetherketone/polyetherimide blends.

The copolyetherketones of this invention are further illustrated by the following examples.

EXAMPLE 1—PARTIALLY ALTERNATING COPOLYMER (I-DPE-T-DPE) T/I=50/50

A two liter resin kettle with a shell for heating and cooling was equipped with a high speed Teflon ® fluorocarbon resin clad tantalum stirrer, a dry nitrogen inlet, a gas outlet to a scrubber and a port for introducing reagents. 0.075 mole (15.23 g) distilled terephthalyl chloride and 0.15 mole (25.53 g) diphenylether was dissolved in 150 g o-dichlorobenzene and added to the reactor. The solution was cooled to −10° to −15° C. with solid carbon dioxide/methanol. 0.30 mole (40.00 g) anhydrous aluminum chloride was added portion wise over 30 minutes with temperature maintained at −10° C. The reaction was warmed to +10° C. for 10 min. and then cooled to −10° C. Then 0.075 mole (15.23 g) distilled isophthalyl chloride was added followed by 0.15 mole (20.00 g) anhydrous aluminum chloride with reaction temperature maintained at −10° C. When addition was complete, coolant was drained from the shell, and the stirrer was turned to high speed. 500 g o-dichlorobenzene preheated to 160° C. was added and steam was introduced into the shell. Particle formation was observed in the dark red-brown system in about a minute. The system was held at 100° C. for 30 minutes and then allowed to cool to 30° C. over a period of 60 minutes. The reaction was then queched by adding 1 liter of methanol chilled to −40° C. Stirring was continued until all color was gone, about an hour. The polymer was filtered and rewashed twice with one liter of methanol. The polymer was transferred to a beaker and boiled in one liter of water until the liquid temperature was 98° C. After filtration the polymer was soaked in 500 g glacial formic acid for 30 minutes, filtered and dried overnight in a vacuum oven at 170° C. with a light nitrogen bleed.

Two samples of the copolyetherketone were analyzed by DSC. The conditions for the first DSC scan were: The first heat was run to 354° C. (37° above Tm), held five minutes, then cooled to room temperature and the second heat was run. All heating and cooling rates were at 10°/min. The Tm was 317° C. and dT was 57.3° C.

Conditions for the second DSC scan were as follows: The first heat was run to 365° C., held for two minutes, and then cooled to 260° C. and annealed at that temperature for 30 minutes. The sample was then cooled to room temperature and the second heat was run. All heating and cooling rates were 20 degrees per minute. The dH was calculated to be 51 J/g. Melt index (390° C., 5 minute hold-up, 8400 g load) was 900.

EXAMPLE 2—PERFECTLY ALTERNATING COPOLYMER T/I=50/50

41.99 g 1,4-bis (4-phenoxybenzoyl)benzene and 18.12 g isophthalyl chloride were dissolved in 350 cc. o-dichlorobenzene in the vessel described in Example 1. The system was cooled to −5° to −8° C. while 72 g aluminum chloride were added. The system was warmed to 0° C. and held 20 min. when the contents were transferred into 625 cc hot o-dichlorobenzene. The system was heated to 100° C. and held 50 min. Work up was as in Example 1. The polymer had a melt index at 390° C. of 3 and an inherent viscosity of 1.7.

The 1,4-bis(4-phenoxybenzoyl)benzene used as starting material in the above-described process was prepared as follows. 6530 g terephthalyl chloride and 13740 g diphenyl ether were dissolved in about 65 l o-dichlorobenzene in a 44 gal. glass line reactor. The system was cooled to 0°–5° C. with stirring and 19714 g aluminum chloride were added with temperature kept below 5° C. The mixture was warmed to 20° C. and held 15 min. Then, 30 gal of methanol, precooled to −50° C., were added over a 15–20 min. period so as to keep pot temperature less than 70° C. The system was cooled to 20°–30° C. and stirred 30 min. The slurry was filtered, reslurried in 30 gal methanol and filtered again. The product was dried in a vacuum oven at 120° C. A portion was extracted with boiling N,N-dimethyl acetamide and crystallized at room temperature to give pure 1,4-bis(4-phenoxybenzoyl)benzene, m 215° C.

EXAMPLE 3—PERFECTLY ALTERNATING COPOLYMER WITH CONTROLLED MOLECULAR WEIGHT; T/I=50/50

42.35 g 1,4-bis(4-phenoxybenzoyl)benzene (prepared as in Example 2), 0.63 g benzoyl chloride and 18.12 g isophthalyl chloride were dissolved in 350 ml o-dichlorobenzene, cooled to −5° to −8° C., and then 72 g aluminum chloride was added over 55 min. During this addition, the temperature was held at −5° C. The reaction was completed as in Example 2.

The conditions for the DSC scan were: The first heat was run to 368° C. (38° above Tm), held two minutes, then cooled to room temperature, and the second heat was run. All heating and cooling rates were at 10°/min. The Tm was 330° C. and the dT was 60.5° C. The polymer had an inherent viscosity of 0.96 and a melt index (390° C., 8.4 kg load) of 145 g/10 min. The dH was determined by the procedure of Example 1 to be 52.4 J/g.

EXAMPLE 4—BLOCK COPOLYMER T/I=50/50, DPE/T BLOCKS=3/2 (ABABA, A=DPE, B=T)

0.075 mole (15.23 g) terephthalyl chloride and 0.1125 mole (19.15 g) diphenylether were dissolved in 100 g o-dichlorobenzene in the reactor of Example 1. 0.26 mole (35.00 g) AlCl$_3$ was added over 30 minutes at −10° C. The temperature was raised to 25° C. by circulating water in the jacket and held for 30 minutes and then chilled to −10° C. 0.075 mole (15.23 g) isophthalyl chloride and 0.0375 mole (6.38 g) diphenylether dissolved in 50 g o-dichlorobenzene were added to the reaction followed by slow addition of 0.19 mole (25.00 g) alumimum chloride. On completion of aluminum chloride addition, 500 g hot (160° C.) o-dichlorobenzene was added. Reaction and isolation were as in Example 1. DSC melting point was 335° C. (2nd heat 10°/min).

EXAMPLE 5—REVERSE ADDITION ALTERNATING COPOLYMER T/I=50/50

0.15 mole (30.46 g) isophthalyl chloride and 0.306 mole (51.47 g) diphenyl ether were dissolved in 150 g dry o-dichlorobenzene in the reactor used in Example 1. The system was cooled to 0° C. with brine. 0.65 mole (86.7 g) anhydrous aluminum chloride was added over a thirty minute period with temperature held at 0° C. 0.15 mole (30.46 g) terephthalyl chloride was added followed by 0.3 mole (40.0 g anhydrous aluminum chloride at 0° C. After completion, the reaction was held for 10 minutes and then 500 g o-dichlorobenzene, preheated to 160° C., was added with vigorous stirring. Completion of the reaction and workup was as in Example 1. The product, melting (Tm) at 319° C. (2nd heat, 10°/min.), had an inherent viscosity of 0.63 (0.5% by weight in sulfuric acid).

COMPARATIVE EXAMPLE A—STANDARD RANDOM COPOLYMER T/I=50/50

0.083 mole (16.92 g) terephthalyl chloride, 0.083 mole (16.92 g) isophthalyl chloride and 0.17 mole (28.37 g) diphenylether were dissolved in 228 g o-dichlorobenzene and added to the reactor described in example (1). After chilling to −10° C., 0.51 mole (68.00 g) aluminum chloride was added over a 55 minute period. The reaction mixture was warmed to 0° C. and held 20 minutes at 0° C. The reaction mixture was then blown into a second flask (5 second transfer time) containing 625 cc of o-dichlorobenzene at 107° C. The temperature fell to 80° C. and the system was reheated to 100° C. and held for 25 minutes. The reaction and workup were completed as described in Example 2 except that the polymer was soaked in 100 ml. conc. HCl plus 750 ml. distilled water after the aqueous boil. The polymer was then washed to neutral washes, treated with 95% formic acid and vacuum dried at 170° C. Polymer inherent viscosity (0.5% in sulfuric acid) was 0.73, and the melt index (390; 5 min.) was 311.

Conditions for the DSC scan were: The first heat was run to 340° C. (39° above Tm), held five minutes, then cooled to room temperature, and the second heat was run. All heating and cooling rates were at 10°/min. The Tm was 301° C. and dT was 50.4° C. To determine dH, a DSC scan was run under the conditions specified in Example 1 except that the sample was annealed at 225° C. for 15 minutes. The dH was calculated to be 20 J/g.

EXAMPLE 6—BLOCK COPOLYMER T/I=70/30, DPE/T BLOCKS=3/2

0.105 mole (21.32 g) terephthalyl chloride, 0.150 mole (25.53 g) diphenylether were dissolved in 100 g o-dichlorobenzene in the reactor used in Example 1. The mixture was cooled to −10° C. and 0.36 mole (48.00 g) aluminum chloride was added over 30 minutes. The system was heated to 25° C. for 30 minutes and then 0.045 mole (9.14 g) isophthalyl chloride and 0.09 mole (12.00 g) aluminum chloride were added followed by 500 g hot (160° C.) o-dichlorobenzene. The reaction was completed as in Example 1.

The conditions for the DSC scan were: The first heat was run to 392° C. ( 36° above Tm), held five minutes, then cooled to room temperature and the second heat was run. All heating and cooling rates were at 10°/min. The Tm was 356° C. and dT was 23° C.

COMPARATIVE EXAMPLE B—RANDOM COPOLYMER T/I=70/30

0.105 mole (21.21 g) terephthalyl chloride, 0.045 mole (9.09 g) isophthalyl chloride and 0.1515 mole (25.75 g) diphenyl ether were dissolved in 150 g o-dichlorobenzene. The mixture was cooled to −10° C. and 0.45 mole (60.00 g) anhydrous aluminum chloride was added while holding.the temperature of the mixture at −10° C. When addition was complete, the mixture was allowed to warm to 0° C. and 500 g o-dichlorobenzene, preheated to 160° C., was added and steam was introduced into the shell. The process was continued as in Example 1.

Conditions for the DSC scan were as in Example 5 except that the end temperature of the first heat was 383° C. ( 39° above Tm). The Tm was 344° C. and dT was 52° C.

EXAMPLE 7—BLOCK COPOLYMER T/I=30/70, DPE/T BLOCKS=4/3

0.06 mole terephthalyl chloride (12.18 g) and 0.08 mole diphenyl ether (13.6 g) were added to 150 g o-dichlorobenzene and chilled to −10° C. at which temperature 0.20 mole aluminum chloride were added, maintaining temperature at −10° C. When addition was complete, the mixture was warmed to 15° C., held fifteen minutes, then recooled to −10° C. 0.14 mole isophthalyl chloride (28.42 g) and 0.12 mole diphenyl ether (20.4 g) in 50 g o-dichlorobenzene were added to the above reaction followed by 0.40 mole aluminum chloride at −10° C. On completion of the aluminum chloride addition, 450 g o-dichlorobenzene at 160° C. were added and the temperature held at 100° C. for 30 minutes. The rest of the workup was as in Example 1.

The product had an inherent viscosity of 0.59 in 25/75 trifluoroacetic acid/methylene chloride and 0.67 in sulfuric acid. DSC analysis showed the polymer to have a Tm of 324° C. (2nd heat −10 ° C./min) and a dT of 32° C. (held 5 min at 40° above Tm-cooled at 10 deg/min). A dH of 15 J/g was obtained in annealing (same conditions as Example 1 except annealing temperature was 243° C.).

COMPARATIVE EXAMPLE C—RANDOM COPOLYMER T/I=30/70

28.65 g diphenyl ether, 10.15 g terephthalyl chloride and 23.69 g isophthalyl chloride were mixed with 175 cc o-dichlorobenzene and cooled to −10° to −15° C. 68 g aluminum chloride were added portion wise over 55 minutes. The system was then warmed to 0° C. over a 10 minute period. The material was then transferred through a U-tube into a second pot containing 625 cc o-dichloro- benzene heated to 160° C. and agitated with a high speed stirrer. The system was heated to 100° C. and held a total of 25 minutes. The polymer was quenched and worked up as in Example 1.

The polymer had an inherent viscosity of 0.88 in sulfuric acid. The polymer showed no tendency to crystallize during the DSC cooling cycle (10 deg/min). Annealing the polymer for 30 minutes at 170° C., 180° C., or 200° C. did not result in any detectable crystallinity. Hence, no measurement of Tm, dH, or dT could be made.

COMPARATIVE EXAMPLE D—RANDOM COPOLYMER, T/I=50/50

A 4-liter glass reactor was charged with 86.38 g (0.51 moles) of diphenyl ether, 50.50 g (0.25 moles) terephthalyl chloride, 50.50 g (0.25 moles) isophthalyl chloride and 2200 ml of o-dichlorobenzene. The mixture was cooled at 0°–5° C. and 202 g (1.51 moles) of anhydrous aluminum chloride were added while the temperature was maintained between 0°–5° C. Upon completion of the aluminum chloride addition, the reaction temperature was increased to 100° C. at approximately 10° C./min. The reaction was held at 100° C. for 30 minutes and then allowed to cool to room temperature. Once at room temperature the agitation was stopped and the o-dichlorobenzene removed by means of a vacuum filter stick. Methanol (1200 ml) was added slowly with agitation, keeping the temperature below 45° C. The mixture was stirred for 30 minutes, filtered and the polymer washed with water. The polymer was steam distilled for 1 hour to remove residual o-dichlorobenzene solvent and soaked for 1 hour in formic acid. It was then filtered and dried in a vacuum oven for 8 hours at 180° C.

The polymer had an inherent viscosity of 0.84 in sulfuric acid. DSC analysis showed a Tm of 299.7° C. (2nd heat −10° C./min) and a dH of 26.8 J/g (same procedure as Example 1 except annealing temperature was 223° C.).

EXAMPLE 8—PARTIALLY ALTERNATING COPOLYMER T/I=50/50

A 50 gal glass-lined reactor was charged with 3833 g (8.15 moles) of 1,4-bis(4-phenoxybenzoyl)benzene (made as in Example 2), 1646 g (8.15 moles) of iosphthaloyl chloride and 18 gal. of o-dichlorobenzene. The mixture was stirred at room temperature until the isophthaloyl chloride was dissolved and then cooled to 0°–5° C. 6503 g (48.9 moles) of anhydrous aluminum chloride were added slowly, keeping the temperature between 0°–5° C. Upon completion of the aluminum chloride addition the reaction temperature was increased to 100° C. at a rate of approximately 2°–4° C./min. The reaction was held at 100° C. for 30 min. and then allowed to cool to room temperature with constant agitation. Once at room temperature, the agitation was stopped and the liquid o-dichlorobenzene solvent was removed using a vacuum filter stick. Methanol (20 gal) was added slowly with agitation, keeping the temperature below 45° C. After the addition of methanol was complete, the mixture was allowed to stir for an addition 30 min. The polymer was isolated by filtration and washed with water. The polymer was then boiled in water to remove residual o-dichlorobenzene solvent. The polymer was dried for 8 hours in a vacuum oven at 180° C.

The polymer had an inherent viscosity of 0.83 in sulfuric acid. DSC analysis showed the polymer to have a Tm of 331.8° C. (2nd heat −10° C./min.) and a dH of 41.5 J/g (same annealing conditions as Example 1 except annealing temperature was 263° C.).

The copolymers prepared in Example 8 and Comparative Example D were subjected to heat deflection tests (ASTM D-648) with the following results:

|  | Heat Deflection Temperature, °C. | |
| --- | --- | --- |
| Test Pressure | 50/50 Random | 50/50 Alternating |
| 66 psi | 157 | 235* |
| 264 psi | 153 | 173 |

*Limit of test

These results show that the ordered copolymer of this invention exhibits higher heat deflection temperatures than the random copolymer of the prior art and thus possesses greater utility at high temperatures than the random prior art copolymers.

Films of the above-prepared 50/50 alternating copolymer and 50/50 random copolymer were prepared and tested for fluid stress crack resistance in low density aviation hydraulic test fluid. Films of each sample, about 5 mils (0.013 cm) thick and about 0.75 in. (1.9 cm) wide, were looped back on themselves and stapled. The distance from the front of the staple around the loop to the back of the staple was approximately 1 in. (2.5 cm). The looped samples were immersed in the hydraulic test fluid at room temperature. After approximately 1 day exposure, the surfaces of the loops opposite the staple were examined using 20x magnification. Cracks could be seen in the surface of the 50/50 random copolymer sample, whereas no cracks could be detected in the surface of the 50/50 alternating copolymer. These results show that the ordered copolymer of this invention exhibits greater stress crack resistance than the random copolymer of the prior art.

EXAMPLE 9—BLENDS OF POLYETHERIMIDE AND PARTIALLY ALTERNATING COPOLYMER (T/I=50/50)

A series of blends of Ultem ® polyetherimide (General Electric Co.) and alternating copolyetherketone of this invention (made by a process analogous to that described in Example 1) were prepared in a Banbury mixing bowl of a Brabender plastograph at 100 rpm and at temperatures of 355° C. for 10 minutes under a nitrogen atmosphere. The melts, after removal, cooled to solid blends. The blends were mechanically chopped into fine pellets and compression molded at a temperature of 350° C. into 0.02" films and ⅛" specimens. The blends were examined visually for uniformity and clarity and were tested according to the following procedures: glass transition temperature (Tg) by differential scanning calorimetry and phase structure by transmission electron microscopy.

The observed Tg values are determined as the midpoint in the step change in specific heat, $C_p$, employing the technique of differential scanning calorimetry at a heating rate of 20° C./min. For each of the blends, a single glass transition temperature corresponding to the weighted mean of the Tg's of the constituents was obtained. The figures are as follows:

|   | Blend | Observed Tg (°C.) | Calculated Tg (°C.) |
|---|---|---|---|
| 1. | 100% PEK | 155 | |
| 2. | 90% PEK/10% PEI | 163 | 161 |
| 3. | 80% PEK/20% PEI | 170 | 168 |
| 4. | 70% PEK/30% PEI | 173 | 174 |
| 5. | 60% PEK/40% PEI | 180 | 180 |
| 6. | 50% PEK/50% PEI | 186 | 186 |
| 7. | 40% PEK/60% PEI | 192 | 193 |
| 8. | 30% PEK/70% PEI | 198 | 199 |
| 9. | 20% PEK/80% PEI | — | 205 |
| 10. | 10% PEK/90% PEI | 211 | 212 |
| 11. | 100% PEI | 218 | |

PEK = copolyetherketone
PEI = polyetherimide
*Calculated Tg values were determined in accordance with the following equation described by T. G. Fox in Bulletin of American Physical Society, 1, 123 (1956): Tg (calculated) = (a) Tg (PEK) + (1-a)Tg (PEI) where "a" = weight fraction of PEK in the blend.

Optical microscopy techniques were employed to investigate phase structure of the resulting blends. Using phase contrast and cross-polarized light, no spherulitic or phase morphology were observed within the range of 80:20 to 20:80 PEK-PEI proportions. Using transmission electron microscopy, osmium-tetraoxide staining techniques under 40 to 116,000×magnification, no detectable phases were observed over the same composition blends, indicating the presence of microscopic homogeneity for the blends.

EXAMPLE 10—BLENDS OF POLYETHERIMIDE AND ALTERNATING COPOLYMER (T/I=50/50)

Another series of blends of Ultem ® polyetherimide and alternating copolyetherketone of this invention (made by a process analogous to that described in Example 8) were prepared by extruder blending followed by injection molding. The blend components were brought together in the desired ratios and tumbled to obtain uniform mixtures. These mixtures were then fed to a 28 mm. Werner & Pfleiderer twin screw extruder and blended at approximately 365° C. The blend was extruded as a strand onto a moving belt, air quenched, and chopped into pellets.

The pelletized blends were injection-molded at a melt temperature of about 380° C. into test specimens using a 1.5 oz. Arburg injection molding machine having a mold temperature of 100° C. Physical properties of these blends are presented in the following table.

| | Properties of Alternating Copolyetherketone/Ultem ® Blends | | | | |
|---|---|---|---|---|---|
| Blend | A | B | C | D | E |
| % Ultem ® | 100 | 85 | 65 | 50 | 35 |
| Flex Modulus, kpsi | 482 | 472 | 485 | 485 | 488 |
| Tensile Modulus, kpsi | 455 | 465 | 457 | 463 | 466 |
| Ty, kpsi | 15.8 | 16.4 | 16.0 | 15.5 | 15.2 |
| Ey, % | 7.7 | 7.6 | 7.4 | 7.0 | 7.0 |
| Tb, kpsi | 11.8 | 13.3 | 12.1 | 11.5 | 12.8 |
| Eb, % | 25 | 30 | 19 | 11 | 18 |
| Melt Flow (8495 g/360° C.) | 25 | 22 | 7 | 4 | 9 |
| Tg, °C. | 218 | 208 | 194 | 182 | 173 |

Ty, Ey = Tensile Strength, Elongation at Yield
Tb, Eb = Tensile Strength, Elongation at Break Flex Modulus determined by ASTM D790
Tensile Modulus, Ty, Ey, $T_b$, $E_b$ determined by ASTM D638
Melt FLow determined by ASTM D1238 (Melt flow of 100% PEK = 31)

These data show that, except for scatter in the break elongation, the tensile properties are substantially the same at all blend ratios. The flexural modulus also shows no substantial change will blend ratio. Therefore, blends covering a wide composition range should be able to be made without these properties being affected.

Blends, A, B, C, D and E were also tested for solvent resistance. Flex bars of blends A–E were stressed and exposed to 1,1,1-trichloroethane. The bars were stressed by clamping them to stainless sheet arcs having a 4 inch (100 mm) radius (3% strain). The clamped bars were then immersed in the solvent. After 13 seconds, the sample of Blend A (100% Ultem ®) exploded, discharging a ⅝" section from the center of the bar with severe cracking observed over the rest of the bar. After 11 seconds, a ⅞" section was discharged from the center of the bar of Blend B. The sample of Blend C broke in half at the center of the bar after being immersed for 1.5 minutes. After a 59 minute immersion, the bar made from Blend D broke in half at the center of the bar. The bar made from Blend E showed no evidence of cracking after a one hour immersion. Clearly, solvent resistance of Ultem ® polyetherimide is improved by blending with the copolyetherketone.

EXAMPLE 11—BLEND OF POLYETHERIMIDE AND BLOCK COPOLYETHERKETONE (T/I=70/30, DPE/T BLOCKS=4/3)

A 50/50 blend was prepared by combining equal parts by weight of Ultem ® polyetherimide and a block copolyetherketone prepared by a procedure analogous to that described in Example 7 except that the T/I mole ratio was 70/30 instead of 30/70 using the same DPE/T ratio. DSC analysis showed one Tg for the blend at 188.9° C. (The Tg for the block copolyetherketone is 141° C).

Series of blends were also prepared blending Ultem ® polyetherimide with 100% I copolyetherketone or 100% T copolyetherketone. Blends of Ultem ® and 100% I copolyetherketone were prepared in ratios of 20/80, 40/60, 50/50, 60/40 and 80/20 and exhibited single Tg's at all blend ratios. Blends of Ultem ® and 100% T copolyetherketone were prepared at Ultem/copolyetherketone ratios ranging from 90/10 to 50/50. Compositions containing 50% or more 100% T copolyetherketone proved difficult to prepare. All of the blends yielded a single Tg. (It should be noted, however, that the single Tg for each blend did not necessarily correspond to the calculated Tg for that blend as in Example 9). Since both 100% T-and 100% I-copolyetherketones appear to be compatible with the polyetherimide, the ordered copolyetherketones of this invention having T or I blocks of any length should also be compatible.

What is claimed:

1. An ordered copolyetherketone consisting essentially of the two repeat units represented by the formulas

(a)

and

(b)

where

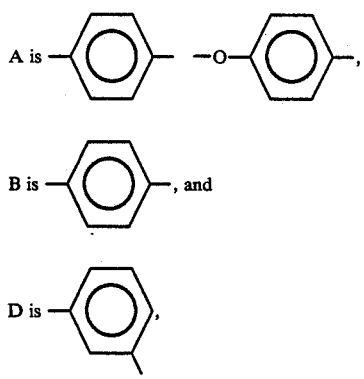

where said (a) and (b) units occur at a ratio in the range of 80:20 to 25:75, said copolyetherketone being characterized by one or more of the following properties:
(i) having a dH which is at least 5 J/g greater than the dH of a copolyetherketone of the same gross composition wherein the repeat units occur in random sequence, dH being the heat of fusion,
(ii) having a dT which is at least 5° C. less than the dT of a copolyetherketone of the same gross composition wherein the repeat units occur in random sequence, dT being the difference between the melting point and the temperature of onset of crystallization, and
(iii) having a Tm which is at least 5° C. greater than the Tm of a copolyetherketone of the same gross composition wherein the repeat units occur in random sequence, Tm being the melting point.

2. A copolyetherketone of claim 1 in which dH is at least 5 J/g greater than the dH of a copolyetherketone of the same gross composition wherein the repeat units occur in random sequence.

3. A copolyetherketone of claim 1 in which dT is at least 5° C. less than the dT of a copolyetherketone of the same gross composition wherein the repeat units occur in random sequence.

4. A copolyetherketone of claim 1 in which Tm is at least 5° C. greater than the Tm of a copolyetherketone of the same gross composition wherein the repeat units occur in random sequence.

5. A copolyetherketone of claim 1 characterized by one or more of the following properties:
(i) having a dH which is at least 10 J/g greater than the dH of a copolyetherketone of the same gross composition wherein the repeat units occur in random sequence,
(ii) having a dT which is at least 10° C. less than the dT of a copolyetherketone of the same gross composition wherein the repeat units occur in random sequence, and
(iii) having a Tm which is at least 10° C. greater than the Tm of a copolyetherketone of the same gross composition wherein the repeat units occur in random sequence.

6. A copolyetherketone of claim 1 or 5 in which the ratio of (a) units to (b) units is in the range of 70:30 to 30:70.

7. A copolyetherketone of claim 1 or 5 in which the ratio of (a) units to (b) units is about 50:50.

8. A copolyetherketone of any of claims 1, 2, 3, 4 or 5 which comprises said (a) units and said (b) units in alternating order.

9. A copolyetherketone of any of claims 1, 2, 3, 4 or 5 which comprises said (a) units or said (b) units in blocks.

10. A process for preparing a copolyetherketone of any of claims 1, 2, 3, 4 or 5 consisting essentially of contacting appropriate quantities of a bis-substituted benzene, where said bis-substituted benzene is selected from bis-(4-phenoxybenzoyl)-1,4-benzene and bis-(4-phenoxybenzoyl)-1,3-benzene and (a) optionally, appropriate quantities of a first phthalyl chloride and diphenyl ether in the presence of Friedel-Crafts catalyst, said first phthalyl chloride being terephthalyl chloride when said bis-substituted benzene is bis-(4-phenoxybenzoyl)-1,4-benzene and being isophthalyl chloride when said bis-substituted benzene is bis-(4-phenoxybenzoyl)-1,3-benzene, followed by (b) appropriate quantities of a second increment of phthalyl chloride and diphenyl ether in the presence of Friedel-Crafts catalyst, said second increment of phthalyl chloride comprising isophthalyl chloride and, optionally, terephthalyl chloride, when said bis-substituted benzene is bis-(4-phenoxybenzoyl)-1,4-benzene and comprising terephthalyl chloride and, optionally, isophthalyl chloride when said bis-substituted benzene is bis-(4-phenoxybenzoyl)-1,3-benzene, the amount of said catalyst in (a) or (b) being the sum of about one mole per each mole of diphenyl ether, four moles per mole of bis-substituted benzene and two moles per each mole of phthalyl chloride.

11. The process of claim 10 in which said bis-substituted benzene is bis-(4-phenoxybenzoyl)-1,4-benzene, and step (a) is omitted.

12. The process of claim 10 in which the resulting copolyetherketone has (a) units and (b) units in a ratio of about 50:50.

13. A shaped article obtained by extruding, compression molding or injection molding a copolyether ketone of claim 1.

14. A shaped article obtained by extruding, compression molding or injection molding a copolyether ketone of claim 5.

15. A composite structure consisting essentially of (a) a copolyetherketone of claim 1 and (b) either a fibrous substrate or a particulate filler.

16. A composite structure consisting essentially of (a) a copolyetherketone of claim 5 and (b) either a fibrous substrate or a particulate filler.

* * * * *